CLYDE H. SPRAGUE
WOODROW SEAMONE
INVENTORS

Claude Funkhouser
ATTORNEY

June 9, 1964   C. H. SPRAGUE ETAL   3,136,180
PLANETARY TRANSMISSION
Filed Aug. 9, 1962   3 Sheets-Sheet 3
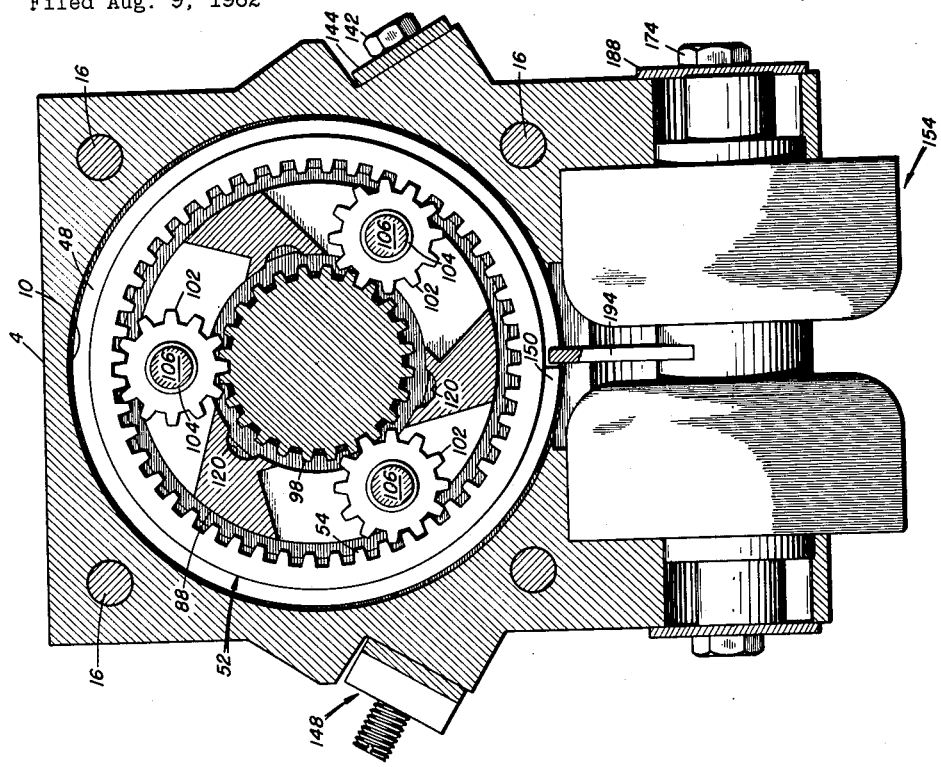
FIG. 5.
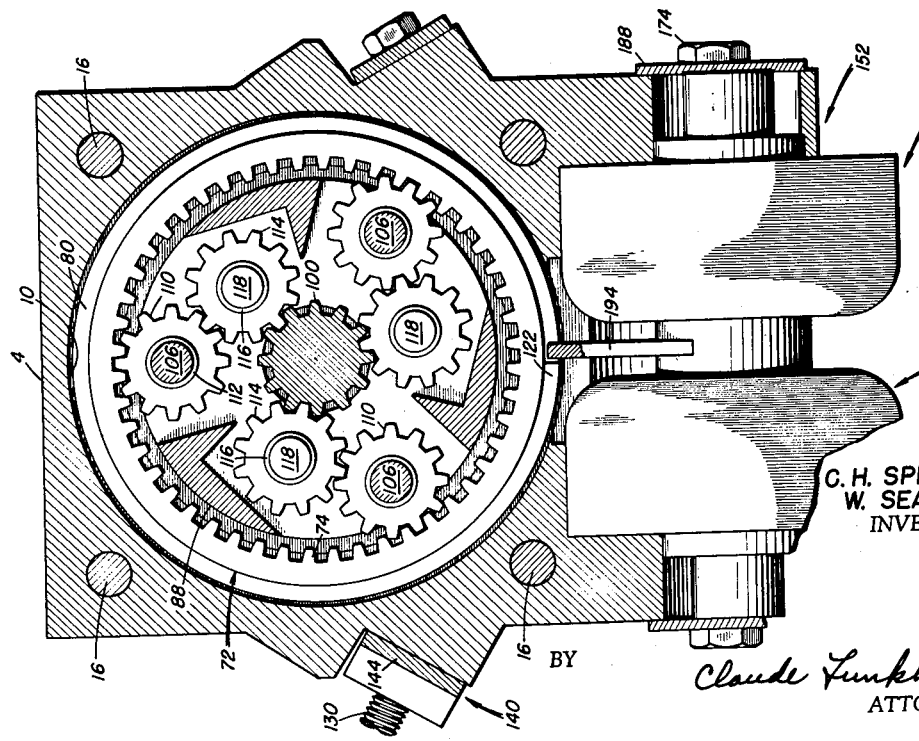
FIG. 4.
C. H. SPRAGUE
W. SEAMONE
INVENTORS
BY 
ATTORNEY United States Patent Office
3,136,180
Patented June 9, 1964

3,136,180
PLANETARY TRANSMISSION
Clyde H. Sprague, Hyattsville, and Woodrow Seamone, Rockville, Md., assignors to the United States of America as represented by the Secretary of the Navy
Filed Aug. 9, 1962, Ser. No. 216,000
5 Claims. (Cl. 74—768)

This invention relates generally to planetary transmissions, and more particularly to an improved bi-directional, rapidly responding planetary transmission of the capstan spring type for coupling a power source with an element to which it is desired to transmit torque.

The recent advent in the guided missile art of bi-stable, electromechanical servo systems has generated a need for a mechanism capable of changing the direction of rotation of its output shaft from full speed in one direction to full speed in the opposite direction within a period of time as small as $1/100$ of a second. Additionally, such a mechanism must be as compact as possible, and must be highly reliable in operation. Numerous proposals have been advanced for constructing a suitable mechanism, many of which have utilized the capstan spring principle. However, until the present invention it has proven difficult to obtain a mechanism which was capable of satisfying the three principal requirements of being highly responsive, reliable and compact. The planetary transmission of the present invention fulfills each of these requirements.

It is, therefore, the principal object of this invention to provide a bi-directional transmission mechanism so constructed as to be quickly responsive and highly reliable in operation, and to be relatively compact in size.

A further object of the invention is to provide a bi-directional transmission employing a pair of stationary capstan springs, said mechanism being so constructed that circumferential expansion and contraction of said springs will change the direction of rotation of the transmission's output shaft.

Another object of this invention is to provide a bi-directional planetary transmission utilizing capstan springs, and so constructed that said springs may be precisely positioned relative to the other elements of the planetary tranmission.

It is also an object of the invention to provide a means for triggering a capstan spring type bi-directional planetary transmission, said means including a torque motor and being so constructed as to require a very small period of time for operation.

A still further object of this invention is to provide a bi-directional planetary transmission utilizing capstan springs and a planetary gear arrangement, and so constructed and arranged as to be relatively compact in size.

Still another object of the invention is to provide a drive release brake arrangement for the output shaft of a bi-directional planetary transmission mechanism, said drive release brake being so constructed as to prevent drive torque applied to the external end of the output shaft thereof from being transmitted to the interior of said planetary transmission.

Yet another object of the invention is to provide a bi-directional planetary transmission mechanism so constructed that the ratio of the output shaft's rotational speed in one direction to its speed in the opposite direction may be precisely determined, and will remain constant.

Other objects and many of the attendant advantages of this invention will be readily appreciated as the same becomes better understood by reference to the following detailed description when considered in connection with the accompanying drawings, wherein:

FIG. 2 is an axial section of the transmission mechanism;

FIG. 5 is a section taken on line 5—5 in FIG. 2, showing the arrangement of the other planetary gear train; and FIG. 6 is a perspective of the planetary carrier, with the drive release brake assembled thereon.

Figure 1:
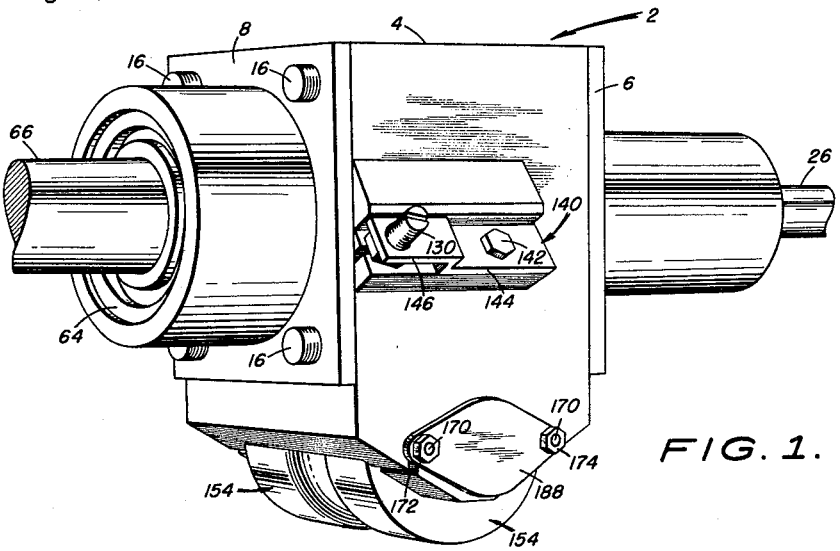
FIG. 1 is a perspective of the transmission mechanism of the invention.

This invention relates to a bi-directional planetary transmission, so constructed as to be capable of reversing the direction of rotation of its output shaft within a period of time as short as $1/100$ of a second. The transmission includes two planetary gear trains having a common planetary carrier and sun gears mounted upon a common shaft. The ring gears of the two trains are independent. The input to the transmission is through the sun gears and the output is taken from the planetary carrier, to which is keyed an output shaft. A set of idler gears in one train provides reversed rotation of the output shaft.

The direction of rotation of the planetary carrier, and hence of the output shaft, is determined by locking one of the ring gears to prevent rotation thereof while freeing the other ring gear for rotation; locking of the ring gear associated with the train containing the idler gears while freeing the other ring gear causes the output shaft to rotate in one direction, whereas locking of the ring gear belonging to the other train while freeing the one in the train containing the idler gears causes rotation in the reverse direction. The ring gears are locked against rotation by capstan springs disposed concentrically about and normally engaging each. Each spring is secured at one end to the stationary housing of the transmission, the free end thereof being engageable with a solenoid torque motor. Actuation of the solenoid will cause one or the other of the springs (depending upon in which direction the solenoid moves) to expand and disengage from the outer cylindrical surface of its associated ring gear, thereby freeing it for rotation.

Referring now to the drawings, the bi-directional transmission is indicated generally at 2, and includes a barrel 4, an input end cap 6, and an output end cap 8. The barrel 4 has a large cylindrical bore 10 extending therethrough, and the end caps 6 and 8 have reduced cylindrical rims 12 and 14, respectively, of a size to be received within the opposite ends of said bore. The end caps and the barrel are secured in assembled relationship by four equally-spaced bolts 16, each of which passes through aligned bores and in the input end cap 6 and the barrel 4, and is threadably received in a bore in the output end cap 8.

The input end cap 6 has a bore 24 therein, through which extends a cylindrical input shaft 26. The outer end of the end cap 6 has a reduced bore 28, the cylindrical wall of which is formed with an enlarged peripheral recess 30 for reception of a ball bearing 32, said bearing supporting the shaft 26. A second ball bearing 34 is seated within a peripheral recess 36 at the inner end of cap 6, and engages an enlarged portion 38 of the shaft 26.

The input end cap 6 has on its inner end a cylindrical surface 40, which is of a length and diameter sufficient to receive the inner race of a ball bearing 42. A radial face 44 extends outwardly from surface 40 to a second cylindrical surface 46, upon which rests the outermost coils of a capstan spring or one-way brake 48. A radial face 50 extends between the surface 46 and the rim 12.

Bearing 42 functions to rotatably mount a cylindrical drum 52, which carries on its inner surface at the inner end thereof a ring gear 54. The outer surface 56 of drum 52 is of a diameter identical to the diameter of cylindrical surface 46.

The output end cap 8 has a cylindrical bore 58 extending therethrough, within which is received a steel sleeve 60. The end face of the cap is provided with a recess 62 of a size to receive a suitable bearing 64 for rotatably supporting an output shaft 66. The sleeve 60 is longer than bore 58, and extends from adjacent the recess 62 to beyond the inner end of the cap 8 a distance sufficient to accommodate the inner race of a ball bearing 68. The sleeve is secured in position and is prevented from rotating relative to the cap 8 by a cylindrical pin 70 press fitted within aligned bores in the two elements.

The bearing 68 serves to rotatably mount upon the inner end of sleeve 60 a drum 72, which is identical in configuration and dimensions to drum 52 and which has an internal ring gear 74 at its inner end and a cylindrical external surface 76 thereon. The end cap 8 has a cylindrical surface 78 thereon of a diameter identical to that of the like surface 46 on cap 6, and upon which is disposed the outer end coils of a capstan spring, or brake, 80, which forms a part of a one-way brake. A radial face 82 extends between cylindrical surface 78 and the rim 14.

Disposed within the space defined by the opposed drums 52 and 72 is a planetary carrier 84 (FIGS. 2, 4, 5 and 6) which includes a cylindrical portion 86 and a spider portion 88. The cylindrical portion 86 has an outer diameter substantially less than the inner diameter of sleeve 60, and extends thereinto. The inner diameter of the portion 86 is of a size to freely receive a reduced diameter portion 90 of output shaft 66. The shaft 66 is provided with a key slot 92, within which is received a flat key 94. The cylindrical portion 86 of the planetary carrier has a slot 96 extending the length thereof, through which the key 94 projects, the slot being substantially wider than the key for a purpose to be described hereinafter.

The spider portion 88 of the planetary carrier has portions cut away therefrom to permit mounting of the planet and idler gears associated with two separate planetary gear trains, and the central portion thereof is hollow for the reception of two spaced sun gears 98 and 100 carried on the inner end of input shaft 26. The two planetary gear trains, which will be separately described, are best understood by reference to FIGS. 2, 4 and 5.

Referring to FIG. 5, the planetary gear train associated with sun gear 98 is seen to include ring gear 54, which is carried by drum 52, and three circumferentially-spaced planet gears 102, each of which meshes with both the sun gear 98 and ring gear 54. Each planet gear 102 has a bore therethrough within which is disposed a tight fitting bushing 104, and is mounted for rotation within a cut-out space on the spider 88 upon a shaft 106 extending through aligned bores 108 in said spider. Rotation of sun gear 98 in one direction, as will be obvious from an examination of FIG. 5, tends to cause the drum 52 to rotate in the opposite direction when the same is not locked against rotation.

Figure 4:
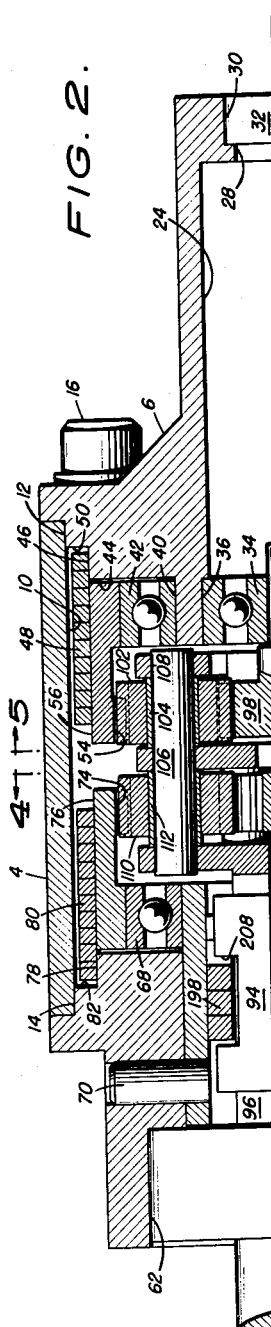
FIG. 4 is a section taken on line 4—4 in FIG. 2, showing the arrangement of one of the planetary gear trains.

The second planetary gear train of the planetary transmission is disposed about the sun gear 100, and is best seen in FIG. 4. Three circumferentially-spaced planetary gears 110 are positioned in cut-out portions of the spider 88 to engage ring gear 74, said gears 110 being mounted on extensions of the same shafts 106 as carry planetary gears 102, and containing bushings 112 therewithin. Three idler gears 114 are disposed within cut-out portions of the spider, and are positioned to mesh with both sun gear 100 and planetary gears 110. The idler gears have bushings 116 therewithin and are rotatably mounted upon shafts 118, said shafts being received in aligned bores 120 in the spider. An examination of FIG. 4 will readily show that the ring gear 74, if free to move, will rotate in the same direction as sun gear 100 when the latter is rotated in a given direction.

The tooth configuration and the manner of arriving at the desired ratios of the various gears will not be described in detail, as the method for designing planetary gear systems is well-known. In the instant transmission the ratio of the rotational speed of ring gear 54 to that of ring gear 74 is one to one, and is obtained by utilizing twenty-four teeth for sun gear 98, twelve teeth for sun gear 100, planetary gears 102 and 110, and idler gears 114, and forty-eight teeth for both ring gears. One of the principal features to be noted in the present mechanism is that the ratio of the speeds of the two ring gears will not vary during operation. This results from having both sun gears fixedly mounted upon the same input shaft.

In the transmission the ring gears will tend to rotate oppositely (when free to do so) and the planetary carrier will tend to remain stationary, a situation resulting in no torque transmission from the input shaft to the output shaft. If, however, one of the ring gears is held stationary while the other is free to rotate the planetary carrier will be forced to rotate, carrying the shaft 66 with it and thus transmitting torque through the transmission. The mechanism for holding, or locking, the ring gear-bearing drums in position centers about the two capstan springs 48 and 80 that constitute elements of the one-way brakes, and will now be described.

Figure 3:
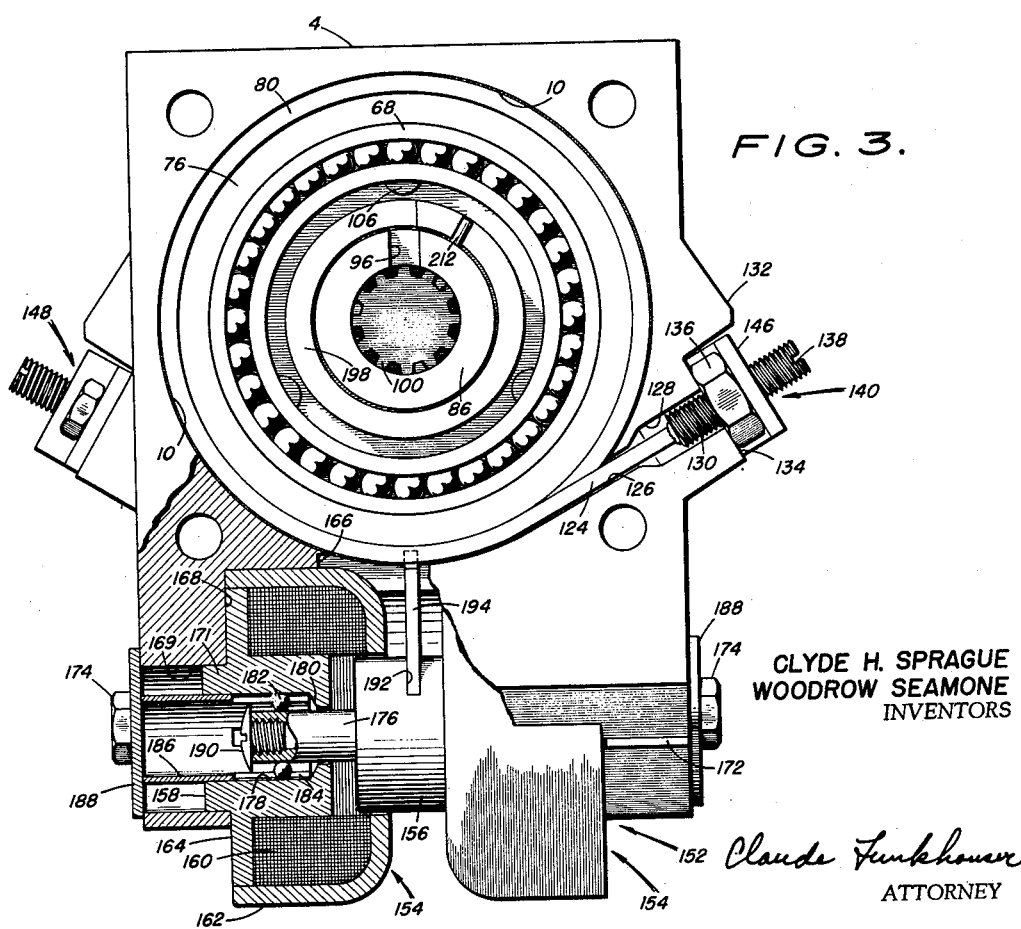
FIG. 3 is a view from the output end of the transmission mechanism, with the output end cap, the output shaft, and the drive release brake removed, and with a portion of the housing broken away to show the construction of one-half of the torque motor.

The capstan springs are identical in construction, and each consists of a rectangular in cross-section, tightly coiled spring steel wire, with the outside and inside cylindrical surfaces of the coil machined to very close tolerances. The coil 80 is disposed so that the last few turns thereof rest upon cylindrical surface 78, which surface has a diameter substantially identical to the inner diameter of the coil and the external diameter of the drum 72. The outer diameter of the coil is several thousandths of an inch smaller in diameter than bore 10. The inner end 122 of the coil (FIG. 4) lies at the bottom of the transmission, and the outer end 124 extends tangentially from the coil through a slot 126 in the barrel 4 (FIG. 3). An enlarged bore 128 in the barrel 4 surrounds the outer end of the coil, and receives the inner end of a set screw 130 welded to said outer end.

The exterior of the barrel has a boss 132 thereon, upon which is a surface 134 lying normal to the tangentially-extending outer coil end 124. A nut 136 is threaded upon the set screw 130, and functions to position the coil within the transmission; tightening of the nut will tend to rotate the inner end 122 of the spring away from the bottom of the transmission, whereas loosening of the nut will allow the spring to be rotated toward said bottom. The set screw 130 is provided with a slot 138 at its outer end to permit it to be held against twisting while the nut 136 is manipulated, thus preventing damage to or undue tension upon the spring. The nut 136, and hence the spring, is firmly locked in position by a clamping plate 140 attached to the barrel by a bolt 142 threaded into a bore therein (FIG. 1). The clamp consists of a flat portion 144 firmly engaging surface 134, and a second portion 146 bent to fit around the nut 136 and having a bore therein for reception of the set screw 130.

The second capstan spring 48 is identical in dimensions to spring 80 and is mounted in an analogous manner; it is secured in position by a clamping plate 148 on the opposite side of barrel 4 from clamp 140. The springs are normally in engagement with their drums and the coils are so disposed that rotation of the drums will cause the springs to wrap tightly thereabout; that is, the inner end 122 of spring 80 and the corresponding inner end 150 of spring 48 (FIG. 5) extend about their respective drums in a direction corresponding to the direction of rotation of the drum. Thus, since the drums rotate in different directions, the two springs must coil in different directions.

The capstan springs normally lie about their drums in engagement therewith. When both springs engage their drums the planetary carrier will be locked in position and output shaft 66 will be stationary. To transmit torque, one or the other of the springs is disengaged from its drum while the other remains in position. Freeing of one drum for rotation causes the planetary carrier to revolve, carrying the output shaft therewith. To reverse the direction of rotation of the output shaft the spring conditions are reversed, and the other drum is freed for rotation while the first is locked in position.

When it is desired to permit a drum to rotate the inner end of its associated capstan spring is moved slightly, thus causing the spring to enlarge. Immediately upon expansion of the spring the drum is free to rotate. If the force causing the end thereof to so move is released, the resiliency of the spring will cause it to immediately contract into engagement with the drum, again locking it against rotation. The inner spring ends in the invention are triggered, or moved outwardly, by a solenoid torque motor 152.

Referring now to FIGS. 1–3, the torque motor 152 is seen to include a pair of opposed solenoids 154 which are electrically activated to cause shifting of an armature 156. Each solenoid includes a core 158 having a coil 160 wound thereabout, a cup-shaped cover 162 being fitted over the coil and the outer rim of a flange 164 carried by the core. The barrel 4 has a rectangular bore 166 in the bottom thereof, which extends from bore 10 to the exterior of the barrel. The opposite sidewalls of said rectangular bore 166 have semi-cylindrical recesses 168 therein each of a size to receive one of the solenoids 154, said recesses 168 opening to the exterior of the barrel 4 to permit assembly of the solenoids thereinto. The barrel also has a large transverse bore 169 extending into each recess 168, within which bore is received a reduced diameter portion 171 of one of the cores 158. Each solenoid has a pair of studs 170 (FIG. 1) projecting from the flange 164 thereof, which studs are received in a pair of spaced, parallel slots 172 in the barrel. Nuts 174 are threaded upon the studs, and serve to retain the solenoids in position.

The common armature 156 is cylindrical in configuration, and has a hollow shaft 176 extending concentrically therethrough. Each core 158 has a central bore 178 terminating at its inner end in a lip 180, and the outer ends of the shaft 176 are received within said bores. To insure nearly frictionless movement of the armature a plurality of balls 182 are confined within longitudinal slots 184 in a cylindrical tube 186, and act as bearings between the outer surface of shaft 176 and the wall of bore 178. The tubes 186 are assembled into their cores through the bore 169, and are of a length equal to the distance between the outer surface of the barrel and the lip 180. The tubes are retained in position by cover plates 188, which are themselves secured by the studs 170 and nuts 174. Screws 190 are threaded into each end of shaft 176, and the heads thereof function as flanges to maintain the balls in position.

The armature 156 has a notch 192 medially thereof, within which is secured an upstanding tab 194. The tab 194 extends almost into contact with the drums 52 and 72, and has cutout notches 196 at its upper end of a size to easily clear the coil springs 48 and 80 (FIG. 2). The free ends 122 and 150 of the two springs confront the central portion of the tab lying between the notches (FIGS. 4 and 5). Activation of one or the other of the solenoids will move the armature 156 theretoward, and will thus cause the tab to engage one of said free ends to thereby circumferentially enlarge the spring, thus freeing its associated drum for rotation.

In many situations it has been found desirable to equip the output shaft of transmissions of the general type to which this invention relates with a separate device release brake, the purpose thereof being to prevent torques and shocks applied to the external end of the output shaft from reaching the interior of the basic transmission assembly. The output shaft in the transmission mechanism of the present invention is provided with such a drive release brake, which also employs a capstan spring.

Referring now in particular to FIGS. 2 and 6, a capstan spring 198 is shown disposed about cylindrical portion 86 of the planetary carrier 84. The opposite ends 200 and 202 of said spring terminate adjacent slot 96, and have arcuate stop elements 204 and 206 welded thereto. A rectangular notch 208 in the key 94 receives the center coils of the spring 198, and the portions of said key on either side of said notch 208 confront the ends 200 and 202 with their attached arcuate stop elements. Projecting from the portion 86 immediately behind the stop elements 204 and 206 are pins 210 and 212.

The external diameter of spring 198 is such that it normally engages with the inner surface of sleeve 60, and the inner diameter is slightly larger than portion 86 of the planetary carrier. If the planetary carrier is rotated in either direction one of the pins 210 or 212 will act upon an element 204 or 206 to thereby move its associated spring end 200 or 202 therewith, which, because of the direction in which the spring coils, will tend to contract the spring and thus disengage it from the sleeve 60. The shaft 66, as has been previously explained, is carried with the planetary carrier in its rotation by the key 94. Thus, it is seen that the drive release brake readily permits torque to be transmitted to the output shaft from within the transmission mechanism.

If, now, a torque be applied to the external end of the output shaft the following will occur. If it is a momentary torque, the shaft 66 will rotate a slight amount beause of the excess width of slot 96 relative to the thickness of key 94. A torque of long duration, however, will bring the key 94 into contact with the end faces of either spring end 200 and its attached element 204 or spring end 202 and its attached element 206. This causes the spring, because of the direction in which it is coiled, to tend to expand. Since the spring normally engages the sleeve 60, this expansion action merely locks the planetary carrier more firmly against rotation, thus prohibiting the passage of externally applied torques to the interior of the transmission mechanism. The extra width of slot 96 is necessary for permitting key 94 to move sufficiently to allow the spring 198 to function.

To recapitulate the manner in which the planetary transmission mechanism operates, consider now that torque from a power source is tending to cause input shaft 26 to roate clockwise. For so long as both springs 48 and 80 are in engagement with their respective drums the planetary carrier will be locked against rotation, as will be the input shaft. If now it is desired to rotate the output shaft in a clockwise direction torque motor 152 is actuated to move the armature 156 in such a direction as to cause capstan spring 48 to disengage from drum 52, thus freeing the latter for rotation.

Shaft 26 is now free to rotate clockwise, and carries sun gears 98 and 100 therewith. Sun gear 98 meshes with planetary gears 102, which in turn mesh with ring gear 54. since the drum 52 carrying ring gear 54 has been freed for rotation, it rotates relative to the planetary carrier.

Sun gear 100 meshes with idler gears 114, which in turn mesh with the planet gears 110. The latter mesh with ring gear 74, and would normally cause it to rotate. However, because drum 72 is locked against rotation the planetary carrier rotates instead, thus transmitting torque to the output shaft. An examination of the planetary gear trains will show that when only drum 52 is free to rotate the planetary carrier will rotate in the same direction as the input shaft, and when only drum 72 is free to rotate the carrier will rotate in a direction opposite from the input shaft. It is thus seen that by actuating the solenoid to expand one or the other of the capstan springs the direction of rotation of the output shaft relative to the input shaft is easily controlled. Moreover, if accurate tolerances and very small clearances are employed between the capstan springs and the elements with which they engage, the response time required for the transmission can be reduced to a very small value.

Obviously, many modifications and variations of the present invention are possible in the light of the above teachings. It is therefore to be understood that within the scope of the appended claims the invention may be practiced otherwise than as specifically described.

What is claimed is:

1. A planetary transmission, including a housing, an input shaft mounted for rotation within said housing, a first planetary gear train disposed within said housing and driven by said input shaft, said first gear train including a first ring gear, a second planetary gear train also disposed within said housing and driven by said input shaft, said second gear train including a second ring gear rotatable oppositely from said first ring gear, a planetary carrier disposed within said housing and operatively connected with both of said gear trains, an output shaft attached to said carrier and extending from said housing, two capstan springs disposed within said housing and each being secured at one of its ends thereto, one of said springs being positioned around each ring gear and being normally in engagement therewith, means attached to said housing for moving either of said capstan springs out of engagement with its associated ring gear, and a drive release brake disposed between the output shaft and said housing for preventing torques applied to the outer end of the output shaft from transmittal to said planetary gear trains.

2. A planetary transmission as recited in claim 1, wherein said means for moving said springs comprises a torque motor including a pair of opposed solenoids secured to said housing and having a common armature, a tab mounted on the armature and positioned to engage and move the unsecured end of either of said capstan springs to thereby enlarge the spring to which the moved end is attached sufficiently to disengage it from its respective ring gear.

3. A planetary transmission including a housing, a planetary carrier disposed within said housing and having a central bore therein, an input shaft mounted for rotation within said housing and projecting into said central bore in said planetary carrier, a first and a second sun gear positioned on said input shaft, a first planetary gear train comprising a first plurality of planetary gears carried by said carrier and driven by said first sun gear, a first ring gear disposed within said housing and driven by said first planetary gears, a second planetary gear train comprising a second plurality of planetary gears carried by said carrier and driven by said second sun gear, a second ring gear disposed within said housing and driven by said second planetary gears in a direction opposite to the direction of rotation of said first ring gear, an output shaft connected to said carrier and projecting from said housing, two capstan springs disposed within said housing and each having one end secured to the housing, one of said springs being positioned around each ring gear and being normally in engagement therewith, the coils of each capstan spring extending around its associated ring gear in a direction whereby when a ring gear and its capstan spring are in engagement the latter will tend to wind more tightly around the ring gear as it rotates in its normal direction, a torque motor mounted on the housing, said torque motor being energizable for moving either of the capstan springs out of engagement with its associated ring gear, and a drive release brake connected between the output shaft and the housing.

4. A planetary transmission as recited in claim 3, wherein the torque motor includes a pair of opposed solenoids having hollow cores, the central axes of said cores lying on a common axis which is spaced from and is normal to the central axis of the input shaft, an armature common to said cores and mounted for sliding movement within said cores, and a tab on the armature and positioned to alternately engage the unsecured ends of said capstan springs in response to sliding movement of said armature for enlarging the spring engaged sufficiently to disengage it from its associated ring gear.

5. A planetary transmission as recited in claim 3, wherein the drive release brake includes a capstan spring surrounding a portion of the planetary carrier, and a key mounted in the output shaft and engageable with the ends of the last-mentioned capstan spring.

References Cited in the file of this patent

UNITED STATES PATENTS

| | | |
|---|---|---|
| 2,018,035 | Roth | Oct. 22, 1935 |
| 2,783,861 | Jungles | Mar. 5, 1957 |
| 2,935,900 | Rabinow et al. | May 10, 1960 |
| 2,939,329 | Doerries | June 7, 1960 |
| 2,946,417 | Hungerford | July 26, 1960 |